United States Patent [19]

Yamamoto et al.

[11] 4,128,881

[45] Dec. 5, 1978

[54] SHARED MEMORY ACCESS CONTROL SYSTEM FOR A MULTIPROCESSOR SYSTEM

[75] Inventors: Mitsuru Yamamoto, Kawasaki; Jun Arai, Yokosuka; Takao Isogawa; Isamu Hasebe, both of Yokohama, all of Japan

[73] Assignee: Panafacom Limited, Kawasaki, Japan

[21] Appl. No.: 658,853

[22] Filed: Feb. 18, 1976

[30] Foreign Application Priority Data

Feb. 20, 1975 [JP] Japan .................................. 50-21250

[51] Int. Cl.$^2$ .......................... G06F 9/20; G06F 13/00
[52] U.S. Cl. .................................................... 364/200
[58] Field of Search ..................................... 340/172.5; 364/200 MS File

[56] References Cited

U.S. PATENT DOCUMENTS

| | | | |
|---|---|---|---|
| 3,317,898 | 5/1967 | Hellerman | 340/172.5 |
| 3,435,418 | 3/1969 | Evans et al. | 340/172.5 |
| 3,555,513 | 1/1971 | Hauck et al. | 340/172.5 |
| 3,573,736 | 4/1971 | Schlaeppi | 340/172.5 |
| 3,601,812 | 8/1971 | Weisbecker | 340/172.5 |
| 3,725,872 | 4/1973 | Balogh, Jr. et al. | 340/172.5 |
| 3,886,525 | 5/1975 | Brown et al. | 340/172.5 |
| 3,931,505 | 1/1976 | Sevcik | 364/200 |
| 3,982,231 | 9/1976 | Bernstein et al. | 364/200 |

Primary Examiner—Melvin B. Chapnick
Attorney, Agent, or Firm—Staas & Halsey

[57] ABSTRACT

In a multiprocessor system having a plurality of processors, each of identical construction, each processor is internally equipped with a fixed address supply source which generates a non-unique fixed address for accessing a common memory unit over commonly connected bus lines, and a sequential state indicate signal generator for generating a logic "1" or "0" synchronizing signal when a special condition (for example, interrupt) occurs with respect to the processor.

A shared memory access control system for a multiprocessor system, as above described, includes circuitry, external to and associated with at least each processor except for one processor, responsive to the synchronizing signal from its respective processor for modifying the non-unique fixed address from the respective processor so that, as a result, each processor is able to address the common memory over the commonly connected bus lines with a unique fixed address.

10 Claims, 4 Drawing Figures

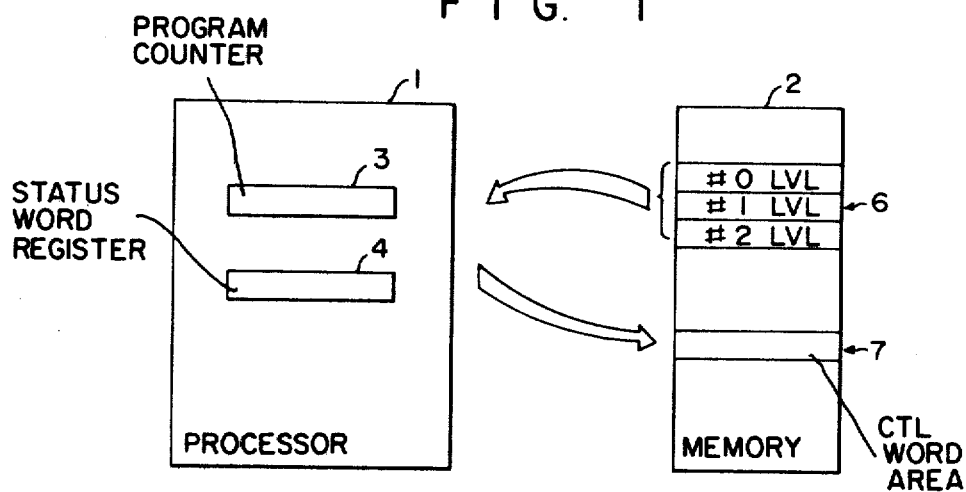
FIG. 1
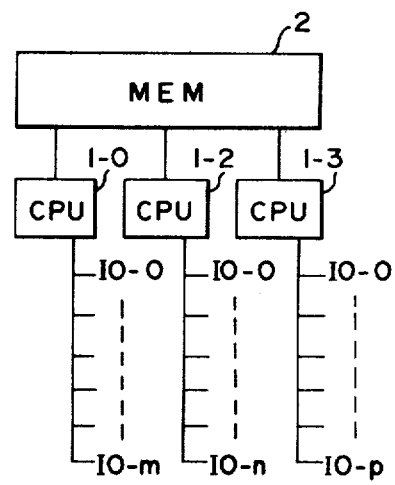
FIG. 3
FIG. 2

SHARED MEMORY ACCESS CONTROL SYSTEM FOR A MULTIPROCESSOR SYSTEM

BACKGROUND OF THE INVENTION

1. Field of the Invention

This invention relates to a data processing unit, and more particularly to a multiprocessor system employing integrated circuits. More in particular, the invention relates to a control system for accessing a fixed address (that is, an address preset in terms of hardware) in a memory unit at the time of generation of a sequence signal, for example, at the time of an interrupt, in the multiprocessor system.

2. Description of the Prior Art

In a central processing unit, instructions located in a memory unit are successively read out and executed. When an emergency task to be processed through the use of the central processing unit arises due to some requirement in the execution of such a program, the program in execution is interrupted in such a manner that it may be resumed later, and control passes to the emergency processing program. This is commonly referred to as an interrupt. The interruption sources are classified into an external source such as, for example, completion of the operation of an input/output unit, clock information, an instruction from an operator or another computer, a fault or the like, and an internal source such as, for example, an overflow, write in an inhibit area, execution of an inhibit instruction, absence of a reference command, or the like.

In the case of the external source, an address (in which the instruction to be executed is located) may be input from the outside but, mainly in the case of the internal source, the address of the next instruction and other information are held and the program jumps to a fixed address for the interrupt.

By the way, the concurrent operation of a plurality of programs is called multiprocessing. This is a multiprocessor system in terms of hardware. The multiprocessor system is complicated in program but is widely used on account of large process capacity, minimization of system failure, and flexibility.

In the case of forming the multiprocessor system with microprocessors, it is desirable that a plurality of processors of the same pattern (that is, of the same LSI circuit configuration) be arranged. In this case, however, each processor is provided with a fixed address supply source operating in accordance with an old-for-new exchange process for obtaining the contents of a program counter and a status word register, for example, according to an interruption source. However, if the fixed address supply sources of the processors are to generate the same fixed address, the respective processors will access the same address in a memory unit.

SUMMARY OF THE INVENTION

A first object of this invention is to provide a high-performance most inexpensive multiprocessor system which is composed of a plurality of microprocessors, each composed of one integrated circuit chip, and in which system the chips are formed in the same pattern to facilitate mass production.

A second object of this invention is to provide a multiprocessor system which is composed of a plurality of microprocessors, each composed of one integrated circuit chip, and in which system fixed address supply sources generating the same address are provided in each processor, but address information derived from the fixed address supply sources differs among the processors even though the integrated circuit chips may be of the same construction.

A third object of this invention is to design a plurality of processor units so arranged that they can each access fixed addresses in memory units which are different for each processor unit with respect to fixed address information generated in a predetermined sequence state, for example, in an interrupt state.

Another object of this invention is to provide a one-chip processor formed with an integrated circuit, the function of which is increased without increasing the number of input and output pins on the processor chip.

Briefly stated, the present invention is to provide a memory fixed address accessing control system for a data processing system of such a type that a plurality of processor units respectively access a common memory based on the contents of fixed address supply sources, said contents being prepared in, and provided from the processor units in a predetermined sequence state, that each of the processor units has fixed address supply sources producing the same address and a sequential state indicate signal oscillator producing a logic "1" or "0" in the above sequence state, and that one or more bits are made different for different processor units and are fixed, by a signal from the oscillator, to the logic "1" or "0" with respect to address information produced by the fixed address supply sources.

BRIEF DESCRIPTION OF THE DRAWINGS

FIG. 1 is a schematic diagram explanatory of the outline of an old-for-new exchange process for the contents of a program counter and a status word register based on an interruption source;

FIG. 2 is a block diagram showing one example of a multiprocessor system in this invention;

FIG. 3 is a diagram for explaining the idea of a memory fixed address accessing control system according to this invention.

DESCRIPTION OF THE PREFERRED EMBODIMENTS

Figure 4:
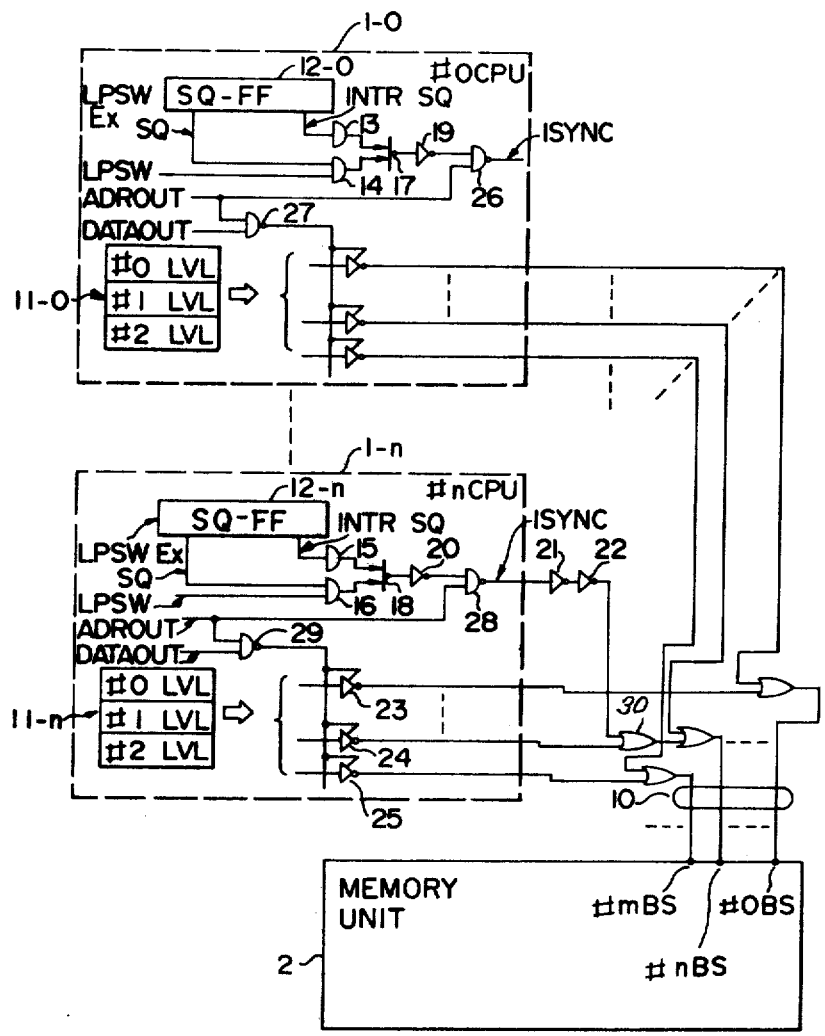
FIG. 4 is a connection diagram of a memory fixed address access control circuit showing one example of this invention.

FIG. 1 is a schematic diagram showing an old-for-new exchange process of the contents of a program counter and a status word register based on an interruption source. In FIG. 1, reference numeral 1 indicates a processor; 2 designates a memory; 3 denotes a program counter (PC); 4 represents a status word register (STW); 6 identifies location areas for the contents of the program counter and the status word register (the contents will hereinafter be referred to as the control words), the location areas respectively corresponding to interruption levels 0, 1 and 2; and 7 shows an existing control word location area.

Let it be assumed that the processor 1 is fetching and processing instructions in accordance with the contents of the program counter 3 and the status word register 4.

In such a state, when an interrupt is caused and control passes to an interrupt processing program, it is necessary that the contents of a register, an indicator which may be used in the interrupt processing, and a return address be preserved. There are some occasions when an interrupt of a higher degree of emergency occurs during the interrupt processing. Accordingly, it is necessary to change the degree of preservation according to the level of the interrupt. In the case where a plurality of interruption sources are caused at the same time, they are processed in accordance with the degree of emergency. At this time, in order that a break in the processing of the interrupt of a certain level may not be caused by the occurrence of an interrupt of a lower level, interrupt inhibit flip-flops are selectively held in their on state for the interruption sources and are turned off with respect to higher levels. Upon occurrence of an interruption source of a high level in the interrupt processing, an interrupt is provided to interrupt the existing interrupt processing. A return address, the contents of a register and a mask are preserved, and the new interrupt processing is initiated. When this interrupt processing is completed, registers are returned and finally the mask is restored. In this case, if an interruption source of an intermediate level has occurred in the processing of the high-level interrupt processing, an interrupt is caused immediately after the completion of the processing of the high-level interrupt and the processing of the interrupt of the intermediate level is achieved.

In FIG. 1, assuming that an interrupt of, for example, an interrupt level 0, occurs, an existing control word is preserved in the aforesaid area 7 so long as it is not inhibited by an interrupt mask, and a control word stored in the "level #0" in the aforesaid area 6 is set in the counter 3 and in the register 4, thus initiating an interrupt processing routine. And upon completion of this interrupt processing routine, the control word which was preserved in the area 7 is transferred therefrom to the counter 3 and to the register 4, restoring the initial processing. This sequence will hereinafter be referred to as a load program status word (LPSW) execution sequence.

For effecting such processing as described above, the processor 1 has prepared therein a fixed address supply source for each interrupt level so that the area 6 may be accessed in accordance with each particular interruption source. In this respect, a microprocessor is also the same as an ordinary program controlled CPU.

In the case of forming the so-called multiprocessor system employing a plurality of such processors as described above, the use of respective processor chips which are to be of the same construction presents one problem. It results in that the fixed address supply sources of the respective processors making up the multiprocessor system are identical in construction with one another, and thus, provide the same fixed address.

In general, the multiprocessor system is made up of a plurality of, for example, three processors 1-0 to 1-3 as shown in FIG. 2, and these processors are interconnected through a common memory unit (a system memory unit) 2. The processors 1-0 to 1-3 each control environment device groups IO connected thereto.

For example, in the case where interruptions of the same level occur in two or more processors, the processors access the same address in the common memory unit 2, and a "racing" phenomenon arises, which phenomenon is the cause of malfunction. To avoid this, it is necessary to provide control words of the same level corresponding in number to the processors used, and to locate them in areas of different addresses. However, in the case where the chips of the respective processors are of the same construction, the areas 6 and 7 on the common memory unit 2, which the respective processors utilize according to the interruption sources, become of the same address.

FIG. 3 is explanatory of the idea of the control system of this invention, illustrating the generation of the fixed address, for example, for the interruption level 0.

In FIG. 3, three 16-coded counters are employed as fixed address supply sources to produce a three-digit fixed address for a zero level. If chips of the same construction are used, the same addresses are naturally produced. As illustrated, processors #0 to #2 respectively employ fixed address supply sources which produce the same fixed addresses, for example, addresses "100" which appear in blocks 8-0 to 8-2 in the binary-coded decimal notation. In this case, the processors #0 to #2 are adapted to access the memory unit 2 in the following manner when an interruption source of the level 0 arises to produce a fixed address. That is, the processor #0 accesses the memory unit 2 with the address "100" 9-0 as it is, that is, unmodified. In the processor #1 address "100" is modified so that there is an address "110" shown in block 9-1, with which the memory unit 2 is accessed. In the processor #2, the address "100" 8-2 generated is modified into an address 37 120" as shown in block 9-2, with which the memory unit 2 is accessed.

FIG. 4 illustrates one example embodying the idea shown in FIG. 3. Reference numerals 1-0 to 1-n indicate processors; 2 designates a memory unit; 10 denotes bus lines; and #0BS to #nBS respectively identify bits in the bus lines 10. Reference numerals 11-0 to 11-n represent fixed address supply sources, which generate fixed address information corresponding to interruption sources of respective levels (LVL), for example, addresses "100," "102" and "104." Reference numerals 12-0 to 12-n show sequence flip-flops (SQ FF), which respectively produce an "interrupt sequence" (INTR SQ) signal or an "LPSW execution sequence" (LPSW EX SQ) signal in accordance with the sequential state of the processors. Reference numerals 13 to 16 refer to AND circuits; 17 and 18 indicate NOR circuits; 19 to 25 designate NOT circuits; 26 to 29 identify NAND circuits; LPSW denotes a load program status word signal; ADROUT represents an address information output indicate signal; DATAOUT identifies a data output indicate signal; and ISYNC shows an interrupt synchronizing signal, which corresponds to the "sequential state indicate signal" herein mentioned. Further, the parts including the elements 12-0, 13, 14, 17, 19, 26 and 12-n, 15, 16, 18, 20, 28 respectively correspond to the "sequential state indicate signal oscillator " herein mentioned.

The processors 1-0 to 1-n respectively have the fixed address supply sources 11-0 to 11-n generating the same address information. For example, in the case of the interrupt level 0 in the interrupt sequence or LPSW execution sequence, the processors transmit the address "100" over the bus lines 10. In this case, however, as described previously with regard to FIG. 3, the addresses "100" are modified into the address "100" of block 9-0, the address "110" of block 9-1 and the address "120" of block 9-2 in each processor for accessing the memory unit 2.

For this modification, the present invention makes use of the signals ISYNC which are produced only in the interrupt sequence and in the LPSW execution sequence. That is, in either one of the sequences and when the signal ADROUT is provided, the signals ISYNC are produced and these signals are supplied to different bit positions. In FIG. 4, a terminal for the signal ISYNC which appears as an output from the processor #0 is not connected to any bit lines of bits 0 to 11 shown in FIG. 3; a terminal for the signal ISYNC from the processor #1 is connected to a line from the bit 7; and a terminal for the signal ISYNC from the processor #2 is connected to a line from the bit 6. As a result of this, when the processor #0 produces the signal ISYNC, the address "100" in the memory unit 2 is addressed and accessed. When the processor #1 generates the signal ISYNC, the address "110" in the memory unit 2 is accessed, and when the processor #2 generates the signal ISYNC, the address "120" in the memory unit 2 is addressed and accessed.

Of course, in the case of an interrupt of a level 1, for example, addresses "102," "112" and "122" are respectively addressed and accessed. In the case of an interrupt of a level 2, for example, addresses "104", "114" and "124" are addressed and accessed.

In FIG. 4, the bit information transmitted over the bus line 10 is shown to have an inverted logic. For example, in the case of the address "100," "111011111111" is transmitted over the bus line 10 in place of "000100000000" shown in FIG. 3. And in the case of the address "110," 111011101111" is transmitted over the bus line.

In FIG. 4, the output from the NOT circuit 24 is a high-level voltage (the logic "0") but the output ISYNC is a low-level voltage (the logic "1"), so that a wired OR circuit operation on both of these outputs, at point 30 (in FIG. 4) is produced on the outside of the processor #1-n, thereby forcibly holding the bus #nBS of the bus line 10 at the low-level voltage (the logic "1").

According to the present invention, a predetermined bit on the bus line is affixed to "0" or "1" in accordance with the sequential state indicate signal ISYNC, as has been described in the foregoing. Therefore, even if the fixed address information from the fixed address supply source on each processor chip is the same address "100" as that from the other processor chips, the address information for accessing the memory is supplied in such modified forms as the addresses "100," "110," "120" .. . for each processor. Further, the abovesaid signal ISYNC is always generated in the interrupt processing and the like and an input and output pin is provided on the processor chip.

Since many circuits of the processor such as an instruction part, an execution part, an IOC part, and so on are all formed on an LSI chip, the number of input and output pins provided on the chip is limited. Accordingly, it is desirable to minimize the number of input and output pins. In the present invention, the signal from this input and output pin is utilized for modifying the fixed address information on the outside of the chip, so that no special input and output pins are required for the modification of the fixed address information.

It will be apparent that many modifications and variations may be effected without departing from the scope of the novel concepts of this invention.

What is claimed is:

1. In a multiprocessor system having a plurality of processors, each of which has a normal operational state and certain special condition operational states, said system including a common memory unit and said plurality of processors; a shared memory unit access control system comprising:

a fixed address supply source, one in each processor, for generating address information of multiple bits and for addressing and accessing said common memory unit in accordance therewith, said address information generated by each said fixed address supply source in each of said respective processors being identical, and a sequential state indicate signal generator, one in each processor, for producing an output signal of a single bit which selectively assumes logic "1" or "0" values in accordance with a predetermined sequence when one of said certain special condition operational states exists; and said system further comprising:

fixing means external to at least each of said processors except for one and responsive to said output signal for fixing at least one bit of said multiple bits, provided by said fixed address supply source of said at least each of said processors except for one, to the logic "1" or "0" values of the output signal produced by said sequential state indicate signal generator, said at least one bit of each respective one of said at least each of said processors except for one being respectively different in identity in relation to said multiple bits, whereby to uniquely alter said address information produced by said fixed address supply source of said at least each of said processors except for one during said special condition operational states.

2. In a multiprocessor system according to claim 1, wherein said processors are each formed in the same pattern with LSI chips so that said fixed address supply source of each processor is constructed to produce the same fixed address information.

3. In a multiprocessor system according to claim 1, wherein said sequential state indicate signal generator for producing said output signal which selectively assumes the logic "1" or "0" values in said special condition operational state comprises:

a sequence flip-flop for producing an interrupt sequence signal and an LPSW execution sequence signal, means for obtaining the logical sum of said interrupt sequence signal and said LPSW execution sequence signal, means for providing an address information output indicate signal, and means for synchronizing said logical sum with said address information output indicate signal, whereby to produce said sequential state indicate signal.

4. In a multiprocessor system according to claim 1, wherein said system includes common bus lines carrying signals from each of the processors to the common memory unit, and wherein each said fixing means external to a respective one of said at least each of said processors except for one comprises means for connecting the output of the sequential state indicate signal generator of said respective one of said at least each of said processors except for one to a respective bus line which is different for each said respective one of said at least each of said processors except for one.

5. In a multiprocessing system which includes a plurality of central processing units arranged to access a common memory and to operate in accordance with at least one special condition operational state, each central processing unit including a fixed address supply means for supplying a multi-bit address signal representing a fixed address in said common memory to be accessed by said central processing unit, said central processing units being of identical internal construction so that said multi-bit address signal of any given central processing unit is identical to the corresponding multi-bit address signal of each and every other central processing unit;

the improvement wherein each respective central processing unit is provided with respective generating means for generating internally in said processing unit a single-bit output, signal in accordance with said at least one special condition operational state; and said system being provided with fixing means, one for at least each respective central processing unit except for one, external to said at least each respective central processing unit except for one and responsive to said single-bit output signal thereof for modifying a respective bit of at least each said multi-bit address signal except for one in a given manner which is unique for each of said at least each respective central processing unit except for one, whereby each of said central processing units accesses a different one of said fixed addresses in said common memory.

6. In the system of claim 5, wherein each said respective generating means includes:

sequential state indicating means for producing at least one state signal indicating a sequential state of said respective central processing unit; and logic means connected to said sequential state indicating means and responsive to said at least one state signal for producing said single-bit output signal;

each said fixing means comprising applying means connecting said logic means to said respective bit of said multi-bit address signal from said fixed address supply means for applying said single-bit output signal to said respective bit, the identity of said respective bit being unique for each multi-bit signal of each fixed address supply means, whereby to produce a unique address signal for each of said fixed address supply means.

7. In the system of claim 6, wherein said logic means is responsive to input signals including an address information output indicate signal, whereby said address signal is uniquely modified in synchronization with the supply of said fixed address signal by said fixed address supply means.

8. In the system of claim 6 including bus means between each of said central processing units and said common memory for carrying said uniquely modified address signal from each of said fixed address supply means.

9. In the system of claim 8, wherein said bus means includes a plurality of bus lines, one for each central processing unit, each carrying one of said uniquely modified address signals.

10. In the system of claim 5, each central processing unit including means for providing an address information output indicate signal and a data information output indicate signal, wherein at least each fixed address supply means except for one is responsive to said address information output indicate signal and to said data information output indicate signal for synchronizing the modification of at least each said multi-bit address signal except for one representing a fixed address with the supply of said fixed address signal by said fixed address supply means and with said data information output signal.

* * * * *

UNITED STATES PATENT AND TRADEMARK OFFICE
CERTIFICATE OF CORRECTION

PATENT NO. : 4,128,881
DATED : December 5, 1978
INVENTOR(S) : Mitsuru Yamamoto et al It is certified that error appears in the above-identified patent and that said Letters Patent are hereby corrected as shown below:

Column 4, line 21, "37 120"" should be --"120"--.

Signed and Sealed this

Twelfth Day of June 1979

[SEAL]

Attest:

RUTH C. MASON
*Attesting Officer*

DONALD W. BANNER
*Commissioner of Patents and Trademarks*